UNITED STATES PATENT OFFICE.

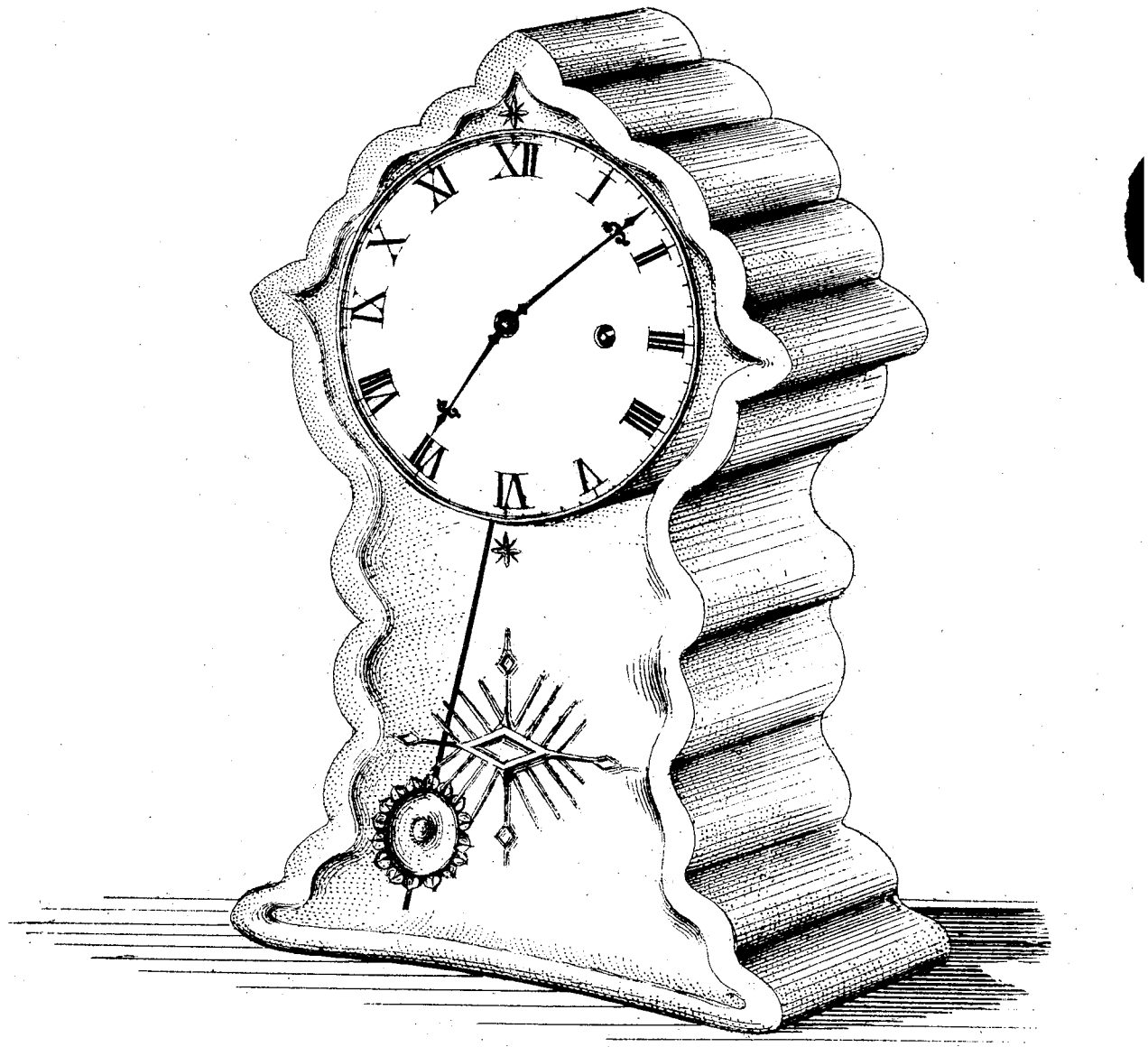

CHARLES A. MOORE, OF WESTBROOK, CONNECTICUT, ASSIGNOR TO HIMSELF AND M. HARTLEY, OF NEW YORK CITY.

IMPROVEMENT IN GLASS CLOCK-CASES.

Specification forming part of Letters Patent No. 119,990, dated October 17, 1871.

*To all whom it may concern:*

Be it it known that I, CHARLES A. MOORE, of Westbrook, in the county of Middlesex and State of Connecticut, have invented certain Improvements in Clock-Cases, of which the following is a specification, reference being had to the accompanying drawing.

My invention relates to glass clock-cases; and consists in manufacturing them of pressed glass, thus producing a new article of trade.

The drawing represents a pressed glass clock-case of one of many styles or designs in which they may be made.

As is well known, clock-cases have heretofore been made of almost every material possessing sufficient strength for protective purposes. Glass coverings have also been made for clocks, but not of pressed glass, or as a substitute for their ordinary cases; and clock-cases have also been made partly of detached pieces of plate-glass. The object of my invention is to produce a strong, durable, cheap, and ornamental case for a clock, and one in which the clock can be arranged or placed as safely and securely as in any of the cases now employed for such purpose. This I accomplish by making them of pressed glass, and in the same manner that pressed glass articles are usually made. It is obvious that, they may be manufactured in any desired form, and of any required thickness, to render them strong and durable; may be ornamented with figures, and be silvered on the interior, and, in fact, may be manufactured so as to have any desired amount of ornamentation. As clock-cases made in this way are simple in manufacture, strong, and durable, and may be of any design almost that the fancy can dictate, their great utility, as well as beauty, are at once apparent.

Having thus described my invention, what I claim is—

As a new article of manufacture, a clock-case made of glass pressed in a mold, substantially as herein described.

CHARLES A. MOORE.

Witnesses:
M. J. MOORE,
GEO. C. MOORE. (36)